United States Patent
Kato et al.

(10) Patent No.: US 10,505,267 B2
(45) Date of Patent: Dec. 10, 2019

(54) ANTENNA DEVICE AND ELECTRONIC APPARATUS

(71) Applicant: Murata Manufacturing Co., Ltd., Nagaokakyo-shi, Kyoto-fu (JP)

(72) Inventors: Noboru Kato, Nagaokakyo (JP); Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/057,842

(22) Filed: Aug. 8, 2018

(65) Prior Publication Data
US 2018/0351240 A1 Dec. 6, 2018

Related U.S. Application Data

(63) Continuation of application No. PCT/JP2017/032737, filed on Sep. 12, 2017.

(30) Foreign Application Priority Data

Sep. 26, 2016 (JP) .................. 2016-186560

(51) Int. Cl.
*H01Q 1/36* (2006.01)
*G06K 19/077* (2006.01)
*H01Q 1/38* (2006.01)

(52) U.S. Cl.
CPC ....... *H01Q 1/362* (2013.01); *G06K 19/07773* (2013.01); *H01Q 1/38* (2013.01)

(58) Field of Classification Search
CPC ............ H01Q 1/36; H01Q 1/362; H01Q 1/38; H01Q 1/24; G06K 19/0773

(Continued)

(56) References Cited

U.S. PATENT DOCUMENTS

2004/0140896 A1 7/2004 Ohkawa et al.
2005/0125093 A1* 6/2005 Kikuchi ............... G06K 7/0008
700/213

(Continued)

FOREIGN PATENT DOCUMENTS

JP 2000-269725 A 9/2000
JP 2004-227046 A 8/2004

(Continued)

OTHER PUBLICATIONS

Official Communication issued in International Patent Application No. PCT/JP2017/032737, dated Nov. 21, 2017.

*Primary Examiner* — Huedung X Mancuso
(74) *Attorney, Agent, or Firm* — Keating & Bennett, LLP

(57) ABSTRACT

An antenna device includes a base and a coil element that includes a coil conductor, first and second terminals respectively connected to first and second ends of the coil conductor, and third and fourth terminals extended from a secondary coil conductive portion of the coil conductor. First, second, third, and fourth electrodes and a radiating conductor are disposed on the base. The first electrode is connected to the first terminal and links to a power feed circuit. The second electrode is connected to the second terminal and links to the power feed circuit. The third electrode is connected to the third terminal. The fourth electrode is connected to the fourth terminal. The radiating conductor links to the third electrode and the fourth electrode. The coil element and the radiating conductor are magnetically coupled to a communication-partner antenna.

20 Claims, 15 Drawing Sheets

(58) Field of Classification Search
USPC .......................................................... 343/895
See application file for complete search history.

(56) References Cited

U.S. PATENT DOCUMENTS

| | | | |
|---|---|---|---|
| 2007/0252703 A1* | 11/2007 | Kato | G06K 19/07749 |
| | | | 340/572.8 |
| 2011/0266883 A1 | 11/2011 | Eray | |
| 2011/0309994 A1* | 12/2011 | Kato | H01P 1/20345 |
| | | | 343/860 |
| 2013/0017781 A1 | 1/2013 | Jones | |
| 2013/0307746 A1* | 11/2013 | Nakano | H01Q 1/2225 |
| | | | 343/850 |
| 2014/0203981 A1* | 7/2014 | Nakano | H01Q 1/521 |
| | | | 343/749 |
| 2014/0203992 A1 | 7/2014 | Nakano et al. | |
| 2015/0257266 A1 | 9/2015 | Murayama et al. | |
| 2016/0182003 A1 | 6/2016 | Teshima et al. | |
| 2017/0040663 A1 | 2/2017 | Ito | |
| 2017/0324158 A1 | 11/2017 | Akiyama et al. | |

FOREIGN PATENT DOCUMENTS

| | | |
|---|---|---|
| JP | 2007-060075 A | 3/2007 |
| JP | 2012-511850 A | 5/2012 |
| JP | 5621951 B1 | 11/2014 |
| JP | 5655959 B2 | 1/2015 |
| WO | 2014/003163 A1 | 1/2014 |
| WO | 2014/003164 A1 | 1/2014 |
| WO | 2015/033632 A1 | 3/2015 |
| WO | 2015/166834 A1 | 11/2015 |
| WO | 2016/143570 A1 | 9/2016 |

\* cited by examiner

ANTENNA DEVICE AND ELECTRONIC APPARATUS

CROSS REFERENCE TO RELATED APPLICATIONS

This application claims the benefit of priority to Japanese Patent Application No. 2016-186560 filed on Sep. 26, 2016 and is a Continuation Application of PCT Application No. PCT/JP2017/032737 filed on Sep. 12, 2017. The entire contents of each application are hereby incorporated herein by reference.

BACKGROUND OF THE INVENTION

1. Field of the Invention

The present invention relates to an antenna device including a coil element and, in particular, to an antenna device used with a conductive member and to an electronic apparatus including the same.

2. Description of the Related Art

Japanese Patent No. 5655959 discloses an antenna device that uses a conductive surface on a circuit substrate or the like as a portion of a radiating element by connecting a power feed circuit to an opening portion of the conductive surface with a power feed element interposed therebetween.

The power feed element is an isolated transformer including a primary coil and a secondary coil magnetically coupled to each other and matches impedance between the power feed circuit, such as an RFIC, and the opening portion of the conductive surface.

The above-described antenna device is magnetically coupled to an antenna with which it communicates (hereinafter referred to as communication-partner antenna) and is used in a communication system operable in an HF band or UHF band. If the communication-partner antenna produces a strong magnetic field and the antenna device is strongly magnetically coupled to that antenna, high voltage may be applied across the primary coil and secondary coil in the above-described isolated transformer, a dielectric breakdown may occur between the primary coil and secondary coil, and a short circuit may occur. Such a short circuit causes critical damage and causes the transformer to malfunction, resulting in the antenna device not functioning as intended.

SUMMARY OF THE INVENTION

Preferred embodiments of the present invention provide antenna devices that overcome the problem of a dielectric breakdown between a primary coil and a secondary coil in a transformer, and electronic apparatuses including the same.

An antenna device according to a preferred embodiment of the present invention includes a base, and a coil element of an antenna coil, the coil element including a coil conductor, a first terminal connected to a first end of the coil conductor, a second terminal connected to a second end of the coil conductor, and a third terminal and a fourth terminal extended from a secondary coil conductive portion of the coil conductor. The first terminal and the second terminal are connected to a power feed circuit. The base includes a radiating conductor connected to the third terminal and the fourth terminal. The coil element and the radiating conductor are magnetically coupled to a communication-partner antenna.

In the above-described configuration, an autotransformer is provided in which the coil conductor is connected between the first terminal and second terminal which defines a primary coil and the secondary coil conductive portion, which is the portion of the coil conductor and defines a secondary coil. Thus, the problem of a dielectric breakdown between the primary coil and the secondary coil that may occur in an isolated transformer is avoided.

The coil element may preferably include an insulating body, the coil conductor may preferably be disposed inside the insulating body, and the first terminal, the second terminal, the third terminal, and the fourth terminal may preferably be disposed on an outer surface of the insulating body. Thus, the antenna device is able to be easily provided simply by surface-mounting the coil element on the base.

The radiating conductor may preferably be a loop conductor defining a loop opening. Thus, the antenna device with high radiation efficiency is able to be provided.

The antenna device may preferably further include a capacitor connected in series to the loop conductor. Thus, the loop conductor and capacitor define a resonance circuit, and the driving efficiency (functional usage) of the loop conductor is able to be increased.

The base may preferably further include a planar conductor, electrically connected to the loop conductor, and surrounding the loop conductor. Thus, the planar conductor also contributes to radiation, and the radiation efficiency of the antenna device is improved.

The secondary coil conductive portion may preferably not overlap the planar conductor when the base is seen in plan view. Thus, a magnetic flux exiting through the secondary coil conductive portion is not easily blocked by the planar conductor, and the coupling coefficient between the secondary coil conductive portion and loop conductor is increased.

The loop conductor and the secondary coil conductive portion may preferably be cumulatively connected to each other. Thus, the magnetic flux produced by the loop conductor and the magnetic flux produced by the coil element strengthen each other, and each of the coupling coefficient between the secondary coil and loop conductor, the coupling coefficient between the loop conductor and communication-partner antenna, and the coupling coefficient between the coil conductor (primary coil) and communication-partner antenna is increased.

The secondary coil conductive portion may preferably overlap the loop opening when the base is seen in plan view. Thus, the coupling coefficient between the secondary coil conductive portion and loop conductor is increased.

The loop conductor may preferably include a planar portion extending in a planar shape. Thus, the planar conductive portion is able to be used as the portion of the loop conductor, and the area of the base restricted by providing the antenna device is able to be reduced. The "planar portion extending in a planar shape" indicates that the width of a narrowest section in the planar portion is larger than the line width of each of the first conductive portion and second conductive portion.

The antenna device may further include a housing that houses the base, and at least a portion of the secondary coil conductive portion may be a conductive portion of the housing. Thus, because the portion of the housing of the electronic apparatus is able to be used as the antenna device, the number of elements dedicated to the antenna device is reduced, and the electronic apparatus is able to be miniaturized or the gain of the antenna device is able to be increased.

An electronic apparatus according to a preferred embodiment of the present invention includes an antenna device. The antenna device includes a base, a coil element defining an antenna coil, the coil element including a coil conductor, a first terminal connected to a first end of the coil conductor, a second terminal connected to a second end of the coil conductor, and a third terminal and a fourth terminal extended from a secondary coil conductive portion defined by a portion of the coil conductor, and a first electrode, a second electrode, a third electrode, a fourth electrode, and a radiating conductor that are disposed on the base, the first electrode is connected to the first terminal and links to a power feed circuit, the second electrode is connected to the second terminal and links to the power feed circuit, the third electrode connected to the third terminal, the fourth electrode connected to the fourth terminal, the radiating conductor links to the third electrode and the fourth electrode and defines a loop current path together with the third electrode and the fourth electrode. The coil element and the radiating conductor are magnetically coupled to a communication-partner antenna.

With the above-described configuration, the electronic apparatus including the antenna device capable of coupling to a communication-partner antenna with a high degree of coupling is obtained.

According to preferred embodiments of the present invention, antenna devices that do not suffer from the problem of a dielectric breakdown between a primary coil and a secondary coil in a transformer and electronic apparatuses including the same are obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
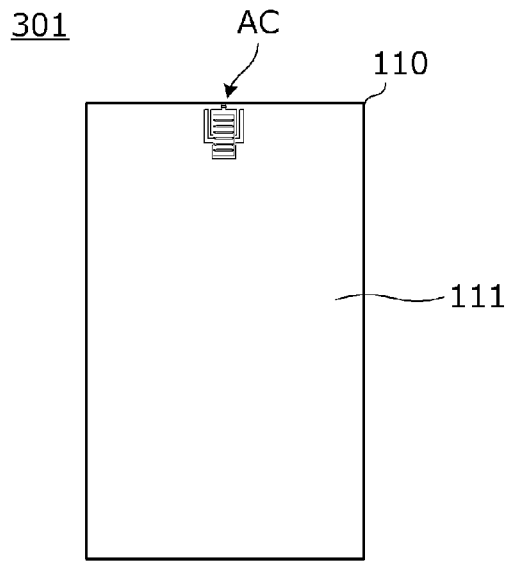
FIG. 1A is a plan view of an antenna device 301 according to a first preferred embodiment of the present invention.

A plurality of preferred embodiments of the present invention are described below with reference to drawings. The same reference numerals are used in the same areas in the drawings. In consideration of the explanation of main points or the facilitation of understanding, the preferred embodiments are separately illustrated for the sake of convenience. The configurations illustrated in different preferred embodiments may be replaced or combined. The description of items in the second and subsequent preferred embodiments common to the first preferred embodiment is omitted, and only different points are described. In particular, the same or substantially the same operational advantages obtained from the same or substantially the same configurations are not described in detail in each preferred embodiment.

The "antenna device" in the preferred embodiments is applicable to both of a signal transmission side and a signal reception side. When this "antenna device" is described as an antenna that causes a magnetic flux to radiate, that antenna device is not limited to a source of emitting the magnetic flux. When that antenna device receives and interlinks a magnetic flux emitted from a communication-partner antenna device, that is, the transmission and reception relationship is reversed, the same or substantially the same operational advantages are obtained.

The "antenna device" in the preferred embodiments described below is an antenna device used for short-range wireless communication using magnetic coupling (inductive coupling) with a communication-partner antenna device. One example of the communication system in which the antenna device is used may be a near-field communication (NFC) system.

The "antenna device" in the preferred embodiments is used in communication systems using at least magnetic coupling. The communication systems include a communication system in which the antenna device couples to a communication-partner antenna device using electromagnetic-field coupling (magnetic coupling and electric-field coupling (capacitive coupling)).

The "antenna device" in the preferred embodiments may preferably use, for example, an HF band, in particular, 13.56 MHz, 6.78 MHz, or its neighboring frequency band.

First Preferred Embodiment

Figure 1B:
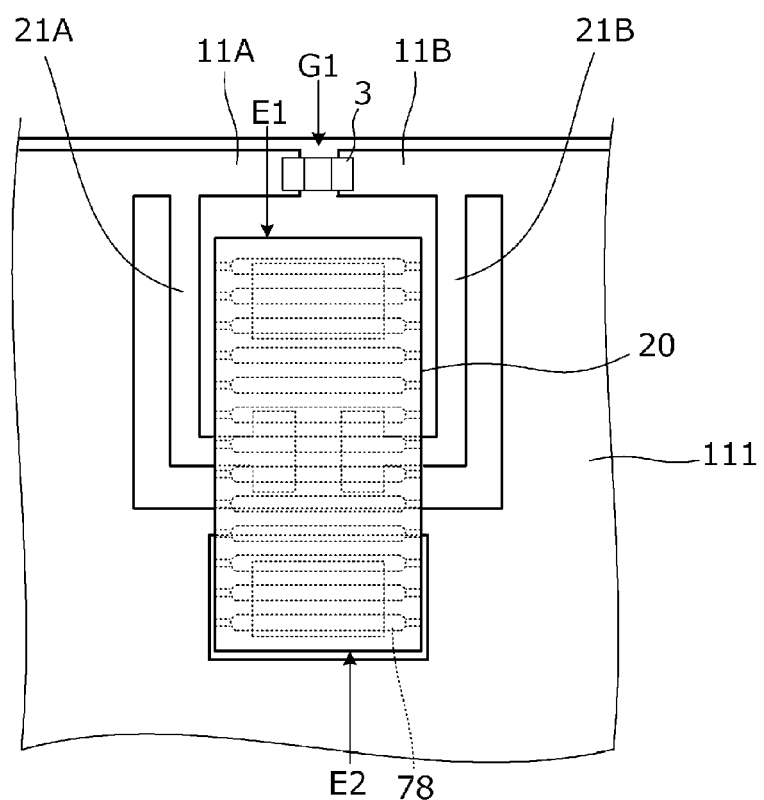
FIG. 1B is a plan view of a coil element placement portion AC thereof.
Figure 2:
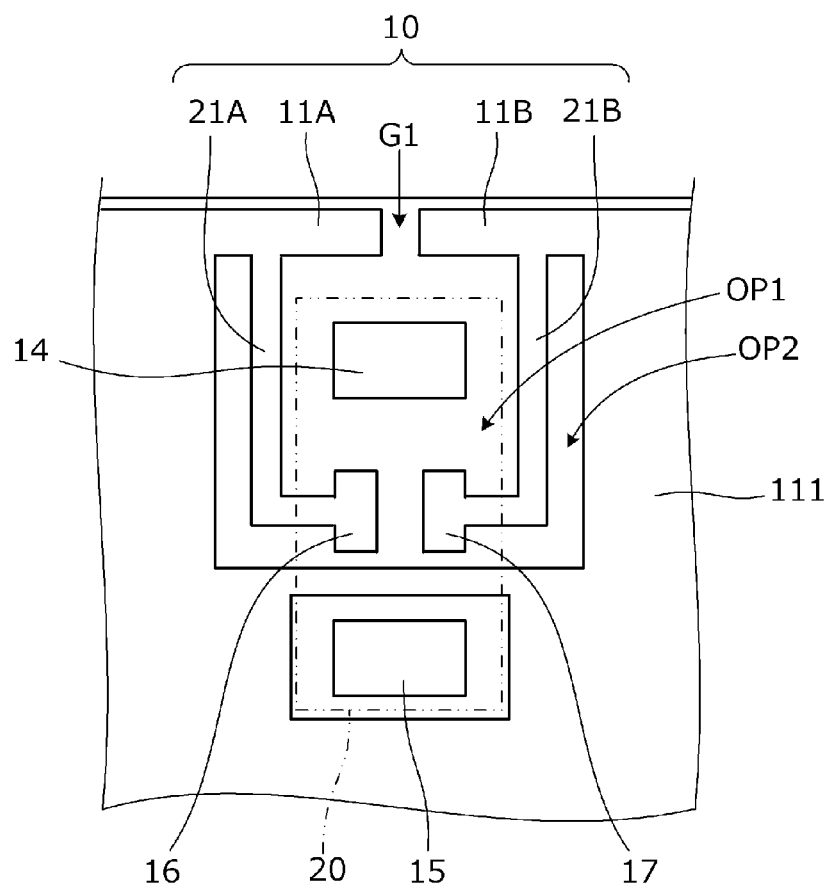
FIG. 2 is a plan view of the coil element placement portion before a coil element 20 is mounted.

FIG. 1A is a plan view of an antenna device 301 according to a first preferred embodiment of the present invention, and FIG. 1B is a plan view of a coil element placement portion AC thereof. FIG. 2 is a plan view of the coil element placement portion before a coil element 20 is mounted.

The antenna device 301 includes a wiring substrate 110 and a conductive member including first conductive portions 11A, 11B, and 111 and second conductive portions 21A and 21B. The first conductive portions 11A, 11B, and 111 and the second conductive portions 21A and 21B are disposed on a surface of the wiring substrate 110 and electrically connected to each other. The antenna device 301 includes the coil element 20 including a coupling coil connected to a power feed circuit. The wiring substrate 110 is an example of a "base".

The first conductive portions 11A and 11B include conductive openings (OP1, OP2) and a gap G1 joining the outer edges of the first conductive portions 11A and 11B and the conductive opening OP1. A capacitor 3 is arranged across the gap G1.

The second conductive portions 21A and 21B are connected to two points of the inner edges of the conductive openings (OP1, OP2) and define a loop current path together with a portion of the first conductive portions 11A and 11B and the capacitor 3. The first conductive portions 11A and 11B and the second conductive portions 21A and 21B define a loop conductor 10. The second conductive portions 21A and 21B may also be regarded as conductive patterns separating the conductive openings (OP1, OP2) into the first conductive opening OP1 and the second conductive opening OP2.

A first end E1 of the above-described coil element in a coil winding direction of the coupling coil overlaps the conductive openings (OP1, OP2) when the wiring substrate 110 is seen in plan view, and the coil element 20 is magnetically coupled to the above-described "loop current path." This "loop current path" corresponds to a "radiating conductor".

In this example, preferably, the planar conductor 111 is a planar conductor and is a ground conductor.

The coil element 20 includes a coil conductor 78 of the coupling coil helically wound around the winding axis and includes the first end E1 and a second end E2 of the coil element opposed to each other with the coil conductor interposed therebetween. The above-described coupling coil corresponds to the "coil conductor". In this example, the winding axis of the coupling coil in the coil element 20 is parallel to the planar conductor 111, but it may not be parallel.

The first end E1 of the coil element 20 overlaps the first conductive opening OP1 when the wiring substrate 110 is seen in plan view. The second end E2 of the coil element is nearer to the planar conductor 111 than to the inside of the loop of the loop conductor 10. That is, the coupling coil inside the coil element 20 overlaps the second conductive portions 21A and 21B as seen in plan view. The coupling coil may not overlap the second conductive portion 21A or 21B and is at a position at which it is magnetically coupled to the loop of the loop conductor. With such an arrangement of the coil element 20, the coupling coil inside the coil element 20 is magnetically coupled to the second conductive portions 21A and 21B.

As illustrated in FIG. 2, the gap G1 in the conductive pattern is present between the first conductive portions 11A and 11B, and the capacitor 3 is connected so as to bridge the gap G1.

The second conductive portions 21A and 21B include coil element connection pads 16 and 17 at their respective end portions. Coil element connection pads 14 and 15 are further disposed on the wiring substrate 110. The coil element connection pads 14, 15, 16, and 17 are connected to the coil element 20. The power feed circuit connected to the coil element connection pads 14 and 15 is disposed on the wiring substrate 110. The coil element connection pads 14 and 15 correspond to a "first electrode" and a "second electrode," respectively. The coil element connection pads 16 and 17 correspond to a "third electrode" and a "fourth electrode," respectively.

Figure 3:
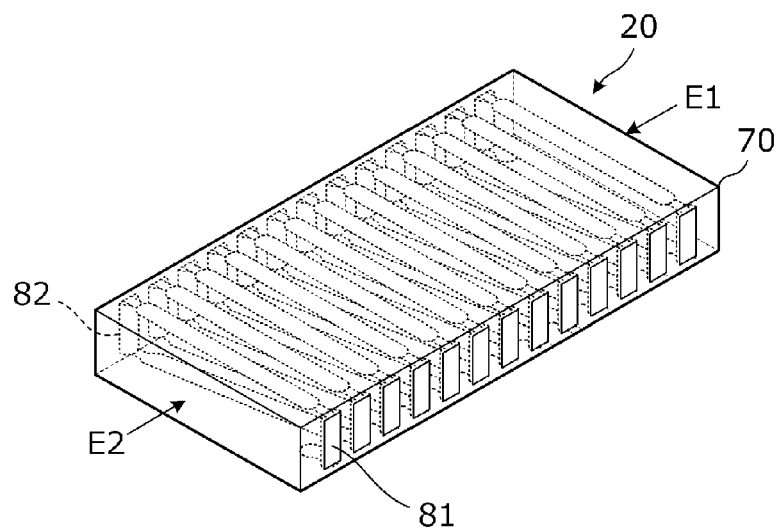
FIG. 3 is a perspective view of the coil element 20.
Figure 4:
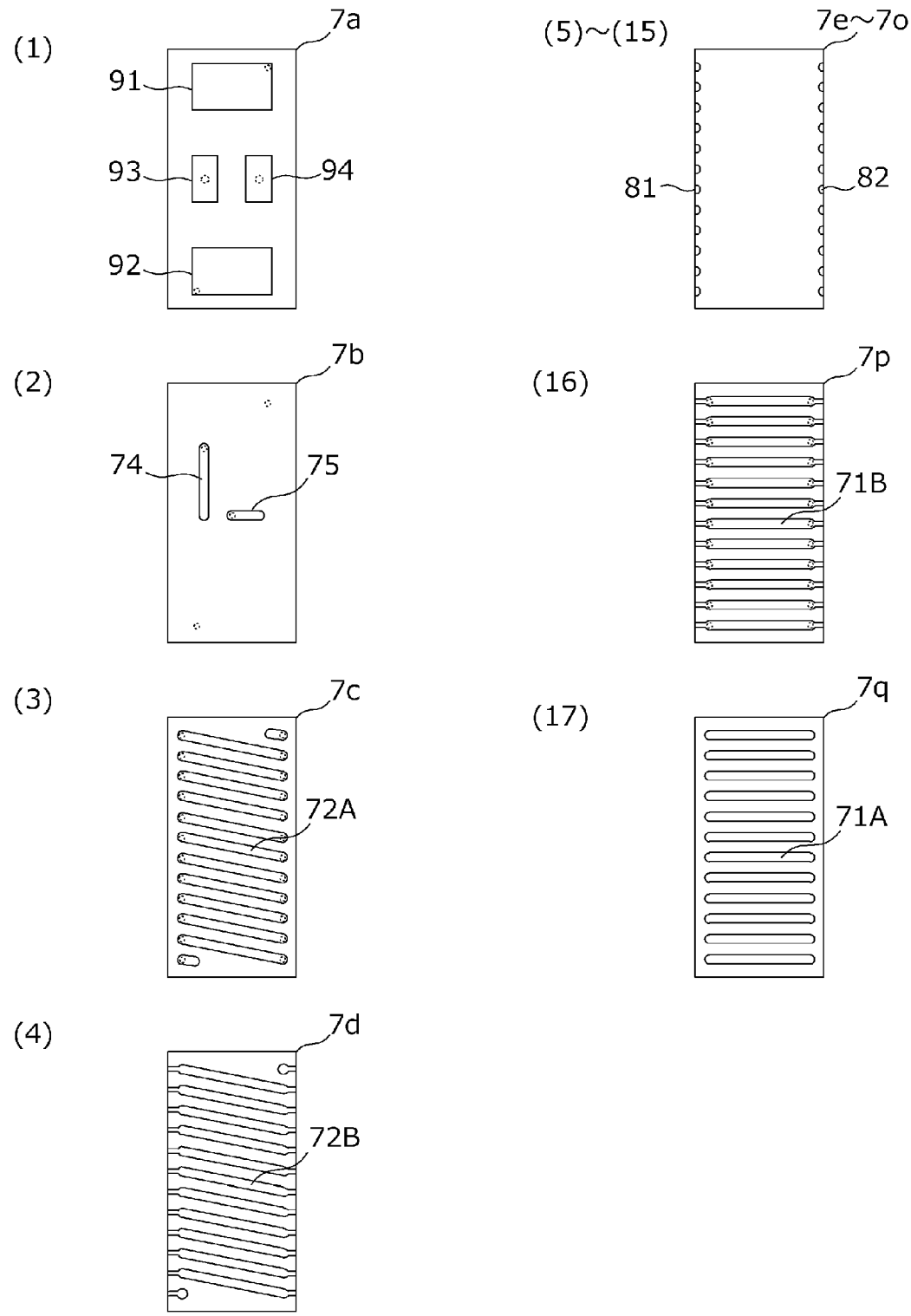
FIG. 4 includes exploded plan views that illustrate electrode patterns and other elements on base layers of a multilayer substrate 70 in the coil element 20.

Next, the structure of the coupling coil element is specifically described. FIG. 3 is a perspective view of the coil element 20. FIG. 4 includes exploded plan views that illustrate electrode patterns and other elements on base layers of a multilayer substrate 70 in the coil element 20.

The coil element 20 is an element in which the helical coupling coil extending along a rectangular or substantially rectangular tube shape is disposed on or in the multilayer substrate 70 having a rectangular or substantially rectangular parallelepiped shape. In FIG. 1B, in which the coil conductor 78 of the coupling coil is illustrated in the coil element 20, this coil conductor 78 of the coupling coil is indicated by a representatively affixed sign, and the coupling coil includes a plurality of linear conductors, interlayer connection conductors, end-face conductors, and other elements, as described later.

Terminals 91 and 92 to be connected to a power feed circuit, such as an RFIC, for example, and two terminals 93 and 94 to be connected to the coil element connection pads 16 and 17 are disposed on a bottom surface (mounting surface) of the coil element 20. The terminals 91, 92, 93, and 94 correspond to a "first terminal," a "second terminal," a "third terminal," and a "fourth terminal," respectively.

The multilayer substrate 70 has a multilayer structure in which a plurality of base layers 7a to 7q illustrated in (1) to (17) in FIG. 4 are laminated in this order. In FIG. 4, the base layer 7a is the lowermost layer, and the base layer 7q is the uppermost layer. In FIGS. 4, (1) to (17) illustrate the bottom surfaces of the base layers 7a to 7q. The bottom surface of the base layer 7a is the mounting surface of the multilayer substrate 70.

The base layers 7a, 7b, 7c, 7p, and 7q are non-magnetic layers having a rectangular or substantially rectangular parallelepiped shape, and one preferred example material thereof may be non-magnetic ferrite, for example. The base layers 7d to 7o are magnetic layers having a rectangular or substantially rectangular parallelepiped shape, and one preferred example material thereof may be magnetic ferrite, for example. That is, the multilayer substrate 70 is configured such that the magnetic layers of the base layers 7d to 7o are disposed between the non-magnetic layers of the base layers 7a, 7b, 7c, 7p, and 7q. The base layers 7a to 7o may not be magnetic layers or may not be non-magnetic layers, and they are insulators. The non-magnetic layer used herein indicates a layer having magnetic permeability lower than that of the magnetic layer, may not be completely non-magnetic, and may be magnetic with relative permeability that is not less than one and is lower than that of the magnetic layer.

The terminals 91, 92, 93, and 94 are disposed on the bottom surface of the base layer 7a illustrated in (1) in FIG. 4.

Wiring conductors 74 and 75 are disposed on the bottom surface of the base layer 7b illustrated in (2) in FIG. 4.

A plurality of linear conductors 72A are disposed on the bottom surface of the base layer 7c illustrated in (3) in FIG. 4. A plurality of linear conductors 72B are disposed on the bottom surface of the base layer 7d illustrated in (4) in FIG. 4. The plurality of linear conductors 72A and linear conductors 72B are connected in parallel to each other with an interlayer connection conductor interposed therebetween.

A plurality of end-surface conductors 81 and a plurality of end-surface conductors 82 are disposed on the base layers 7e to 7o illustrated in (5) to (15) in FIG. 4.

A plurality of linear conductors 71B are disposed on the bottom surface of the base layer 7p illustrated in (16) in FIG. 4. A plurality of linear conductors 71A are disposed on the bottom surface of the base layer 7q illustrated in (17) in FIG. 4. The plurality of linear conductors 71A and linear conductors 71B are connected in parallel to each other with an interlayer connection conductor interposed therebetween.

The plurality of linear conductors 72B are sequentially connected in series to the plurality of linear conductors 71B with the end-surface conductors 81 and 82 interposed therebetween.

The linear conductors 71A, 71B, 72A, and 72B and the end-surface conductors 81 and 82 define a rectangular or substantially rectangular helical coupling coil preferably including about 12 turns, for example.

Figure 5:
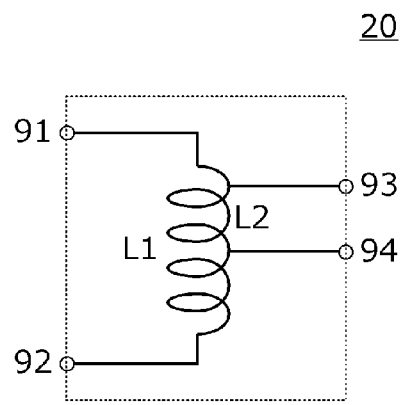
FIG. 5 is a circuit diagram of the coil element 20.

FIG. 5 is a circuit diagram of the coil element 20. The coil element 20 includes the first terminal 91 connected to the first end of the coupling coil, the second terminal 92 connected to the second end of the coupling coil, and the third terminal 93 and fourth terminal 94 extended from a secondary coil conductive portion of the coupling coil, as illustrated in FIG. 4. The fourth terminal 94 is extended from the midpoint of the coupling coil. The third terminal 93 is extended from a position a predetermined number of turns distant from that midpoint.

The secondary coil conductive portion in the coil element 20 overlaps a loop opening of the loop conductor 10 when the base is seen in plan view. Thus, the secondary coil conductive portion and the loop conductor are magnetically coupled to each other.

Figure 6:
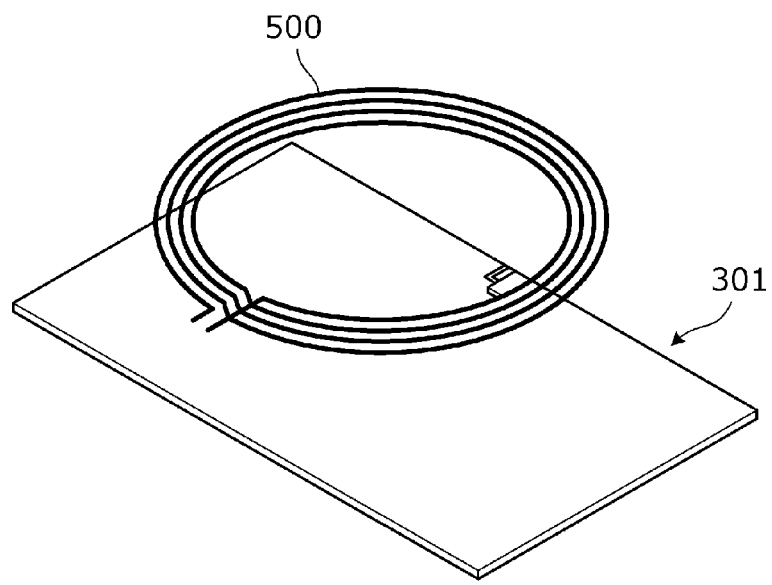
FIG. 6 is a perspective view that illustrates a positional relationship between the antenna device 301 in the first preferred embodiment of the present invention and a communication-partner antenna 500.
Figure 7:
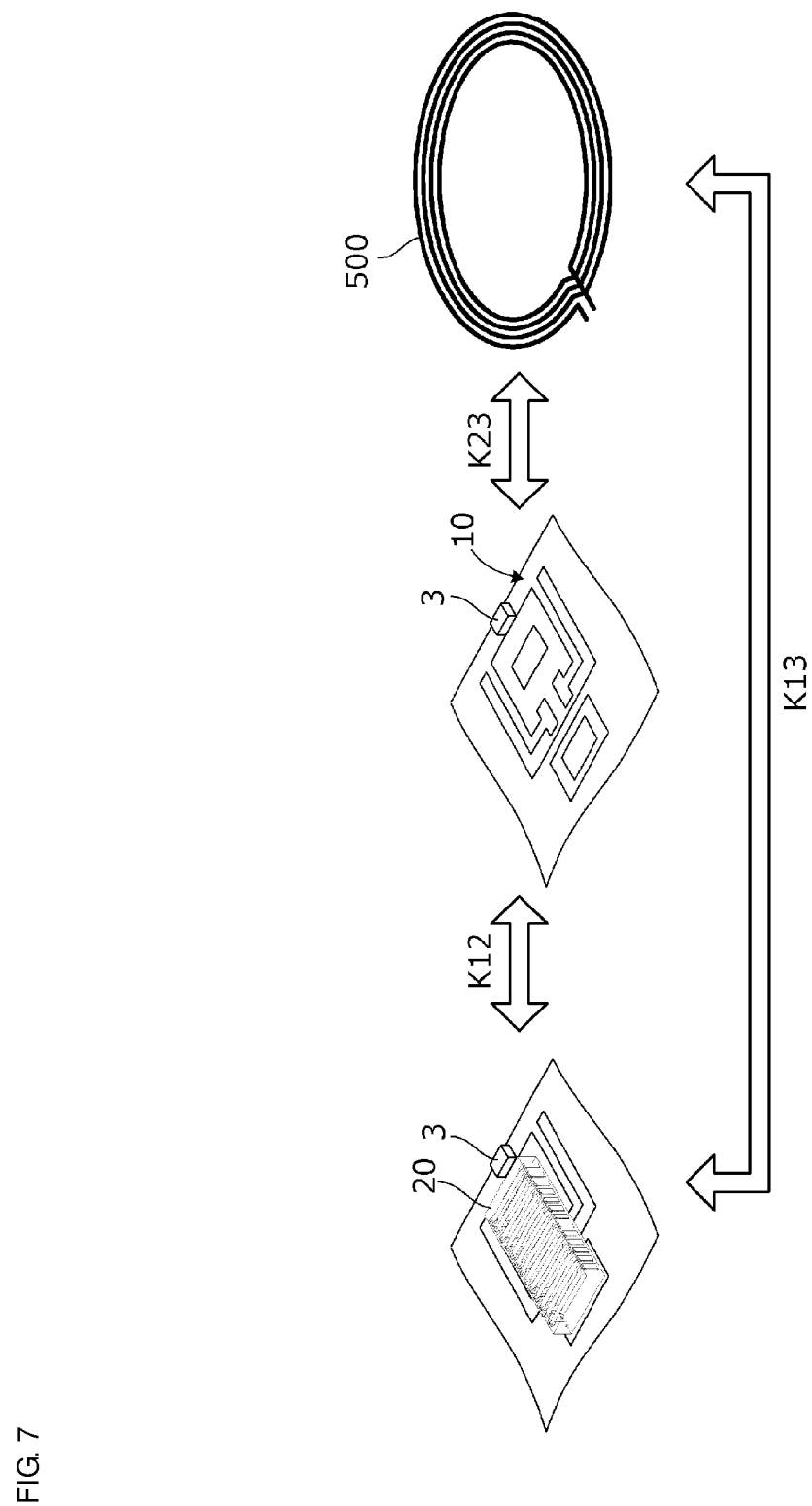
FIG. 7 illustrates how the antenna device 301 and the communication-partner antenna 500 are coupled.

FIG. 6 is a perspective view that illustrates a positional relationship between the antenna device 301 in the present preferred embodiment and a communication-partner antenna 500. FIG. 7 illustrates how the antenna device 301 and the communication-partner antenna 500 are coupled. In FIG. 7, the coupling coil in the coil element 20 and the loop conductor 10 are coupled to each other with the coupling coefficient k12, and the loop conductor 10 and the communication-partner antenna 500 are coupled to each other with the coupling coefficient k23. In addition, the coupling coil in the coil element 20 and the communication-partner antenna 500 are coupled to each other with the coupling coefficient k13. Accordingly, compared to an antenna device in which the coupling coil is simply disposed on an edge portion of the planar conductor 111 on the wiring substrate, the coupling with the communication-partner antenna 500 is improved by roughly the coupling coefficient k23.

Figure 8:
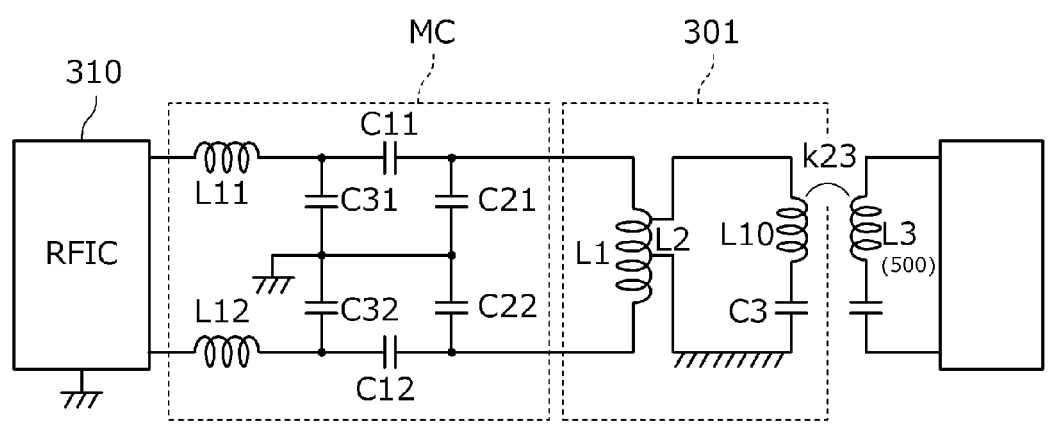
FIG. 8 is a circuit diagram of the antenna device 301 in the first preferred embodiment of the present invention and a circuit connected thereto.

FIG. 8 is a circuit diagram of the antenna device 301 in the present preferred embodiment and a circuit connected thereto. Here, the antenna device 301 section is illustrated as an equivalent circuit. The coupling coil inside the coil element 20 in the antenna device 301 is represented by inductors L1 and L2. The loop conductor 10 is represented by an inductor L10. A capacitor C3 corresponds to the capacitor 3 connected to the loop conductor 10. The inductors L2 and L10 and capacitor C3 define an LC resonance circuit. The resonant frequency of this LC resonance circuit is in a frequency band used in communication.

The communication-partner antenna 500 is represented by an inductor L3. The inductor L1 defines a primary antenna. The resonance circuit including inductors L2 and L10 and capacitor C3 define a secondary antenna.

The inductor L1 is connected to an RFIC 310 with a matching circuit MC interposed therebetween. In this example, inductors L11 and L12 and capacitors C11, C12, C21, C22, C31, and C32 define the matching circuit MC. One example of the RFIC 310 may be an integrated circuit including a wireless communication circuit for NFC using the 13.56 MHz band.

As illustrated in FIG. 8, the first terminal 91 and the second terminal 92 of the coupling coil are connected to a balanced circuit and the fourth terminal 94 (see FIG. 5) corresponds to the midpoint of the coupling coil, and thus the fourth terminal 94 is at zero potential. Because the planar conductor 111 is a ground conductive pattern, the midpoint of the coupling coil is illustrated as being grounded in FIG. 8.

The balanced circuit, which supplies power to the primary antenna (inductor L1), may be replaced with an unbalanced circuit. The planar conductor 111 may not be a ground conductive pattern.

Figures 9A, 9B, 9C:
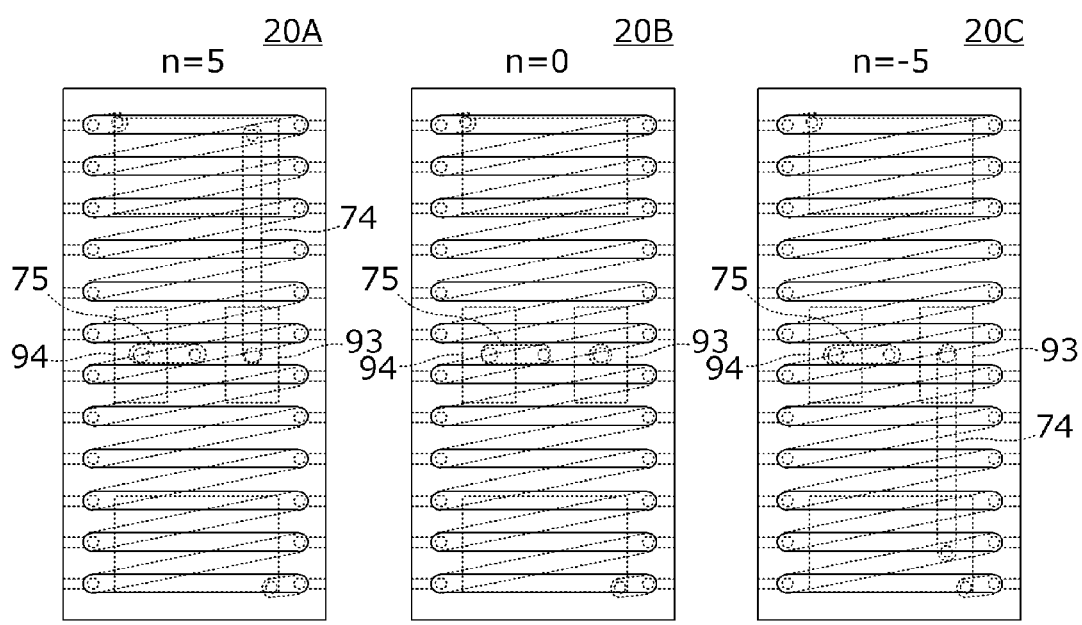
FIGS. 9A to 9C are plan views of coil elements and each illustrates a relationship between a position at which each of a third terminal and a fourth terminal is extended from a coupling coil inside the coil element 20 and the number of turns of a secondary coil.

FIGS. 9A to 9C are plan views of coil elements and each illustrates a relationship between the position at which each of the third terminal and fourth terminal is extended from the coupling coil inside the coil element 20 and the number of turns of the secondary coil. In the illustrated coil elements, the fourth terminal is extended from the fixed position, and the third terminal is extended from different positions. Unlike FIG. 4, which includes plan views of base layers, looking at the electrode-pattern surface, FIGS. 9A to 9C are plan views from the upper surface side of the coil element. Therefore, the third terminal 93, the fourth terminal 94, and other elements are shown from opposite directions in FIG. 4 and FIGS. 9A to 9C.

A coil element 20A illustrated in FIG. 9A is the same or substantially the same as the coil element 20 illustrated in FIG. 4. A first end of the wiring conductor 74 is connected to the third terminal 93, and a second end of the wiring conductor 74 is connected to a position corresponding to the number of turns n of the secondary coil=5. A coil element 20B illustrated in FIG. 9B is an example in which the position from which the third terminal is extended and the position from which the fourth terminal is extended are the nearest to one another and in which the number of turns n≈0. In a coil element 20C illustrated in FIG. 9C, the first end of the wiring conductor 74 is connected to the third terminal 93, and the second end of the wiring conductor 74 is connected to a position corresponding to the number of turns n of the secondary coil=−5. In FIGS. 9A to 9C, for the sake of clarity of illustration, the conductive pattern on the uppermost layer is indicated by solid lines.

Figure 10A:
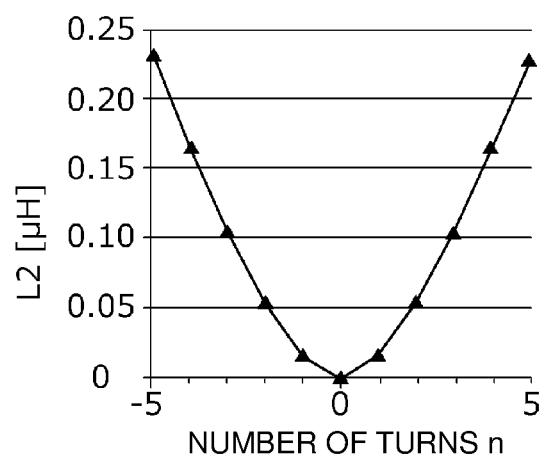
FIGS. 10A and 10B illustrate changes in the inductance of inductors L1 and L2, respectively, with respect to the number of turns n.
Figure 10B:
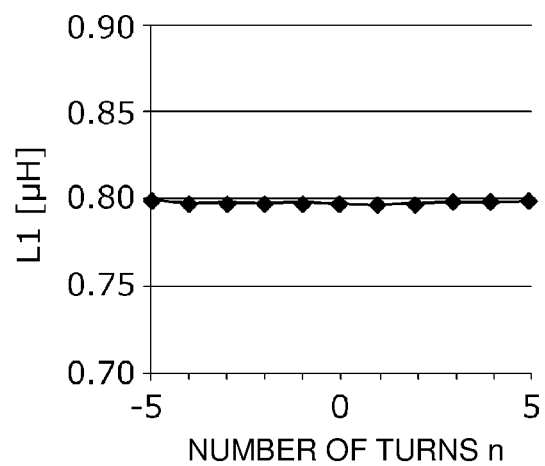

FIGS. 10A and 10B illustrate changes in the inductance of the inductors L1 and L2 (see FIG. 5), respectively, with respect to the number of turns n.

As described above, the number of turns n of the secondary coil is set by the position of the coupling coil from which the third terminal is extended (position with respect to the midpoint of the coupling coil). The position of the coupling coil from which the fourth terminal is extended may be a position different from the midpoint.

According to the present preferred embodiment, an antenna device free from the problem of a dielectric breakdown between a primary coil and a secondary coil that may occur in an isolated transformer and an electronic apparatus including the same are provided.

Second Preferred Embodiment

In a second preferred embodiment of the present invention, changes in the coupling coefficient between coils corresponding to differences in the position of the coupling coil in the coil element from which the third terminal is extended are illustrated.

Figure 11A:
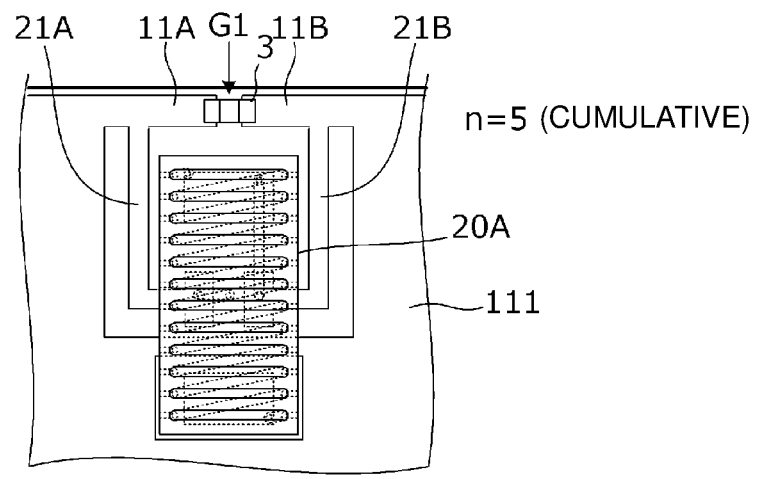
FIG. 11A is a plan view of a coil element placement portion in an antenna device including a coil element 20A.
Figure 11B:
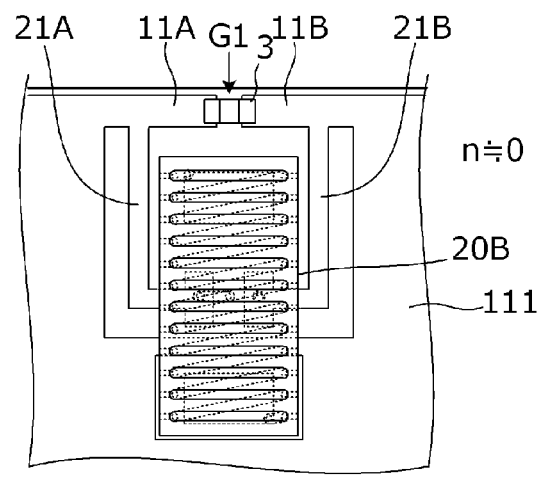
FIG. 11B is a plan view of a coil element placement portion in an antenna device including a coil element 20B.
Figure 11C:
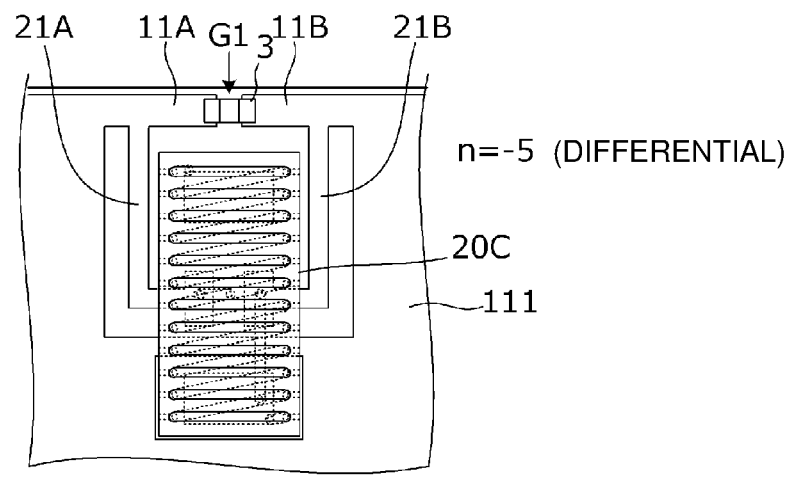
FIG. 11C is a plan view of a coil element placement portion in an antenna device including a coil element 20C.

FIG. 11A is a plan view of a coil element placement portion in an antenna device including the coil element 20A. FIG. 11B is a plan view of a coil element placement portion in an antenna device including the coil element 20B. FIG. 11C is a plan view of a coil element placement portion in an antenna device including the coil element 20C.

Figure 12A:
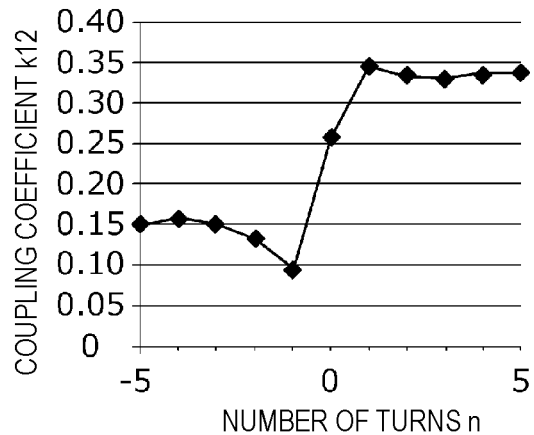
FIG. 12A illustrates changes in the coupling coefficient k12 between the coupling coil in the coil element and a loop conductor 10 (see FIG. 7) with respect to the number of turns n of the secondary coil.
Figure 12B:
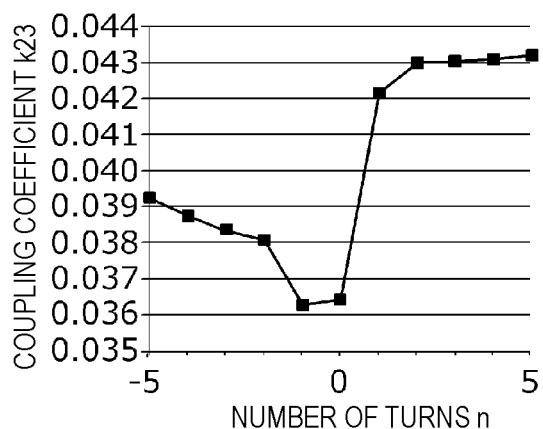
FIG. 12B illustrates changes in the coupling coefficient k23 between the loop conductor 10 and communication-partner antenna 500 with respect to the number of turns n of the secondary coil.
Figure 12C:
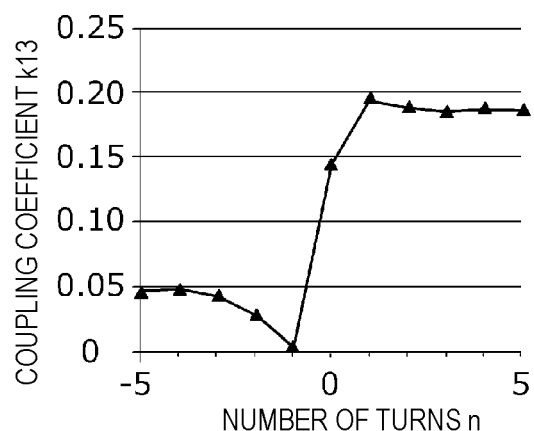
FIG. 12C illustrates changes in the coupling coefficient k13 between the coupling coil in the coil element and communication-partner antenna 500 with respect to the number of turns n of the secondary coil.

FIG. 12A illustrates changes in the coupling coefficient k12 between the coupling coil in the coil element and loop conductor 10 (see FIG. 7) with respect to the number of turns n of the secondary coil. FIG. 12B illustrates changes in the coupling coefficient k23 between the loop conductor 10 and communication-partner antenna 500 with respect to the number of turns n of the secondary coil. FIG. 12C illustrates changes in the coupling coefficient k13 between the coupling coil in the coil element and communication-partner antenna 500 with respect to the number of turns n of the secondary coil.

As illustrated in FIGS. 12A to 12C, when the number of turns n of the secondary coil=5, the coupling coefficients k12, k23, and k13 are the largest. Here, when the number of turns n is positive, the state is in cumulative connection, whereas when the number of turns n is negative, the state is in differential connection.

Figure 13:
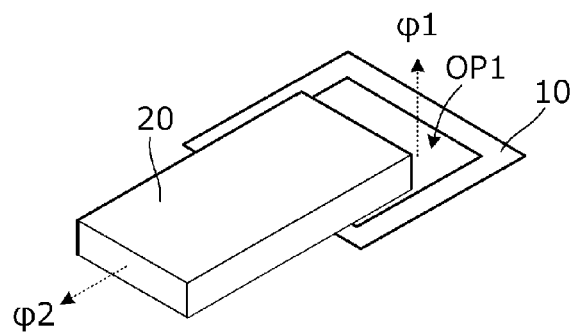
FIG. 13 illustrates a magnetic flux $\phi 1$ passing through an opening OP1 of the loop conductor 10 and a magnetic flux $\phi 2$ passing through the coil element 20 in a cumulative connection state.
Figure 13:
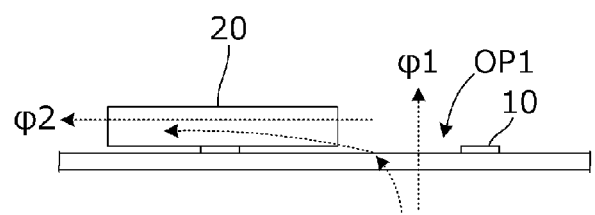
Figure 14:
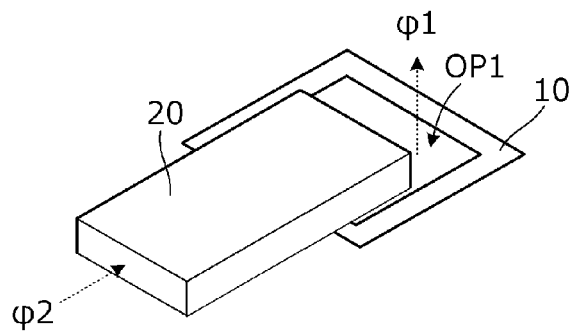
FIG. 14 illustrates the magnetic flux $\phi 1$ passing through the opening OP1 of the loop conductor 10 and the magnetic flux $\phi 2$ passing through the coil element 20 in a differential connection state.
Figure 14:
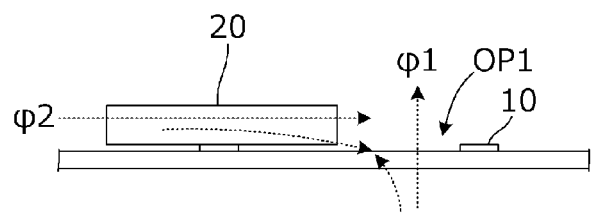

The cumulative connection and the differential connection are illustrated in FIGS. 13 and 14. FIGS. 13 and 14 illustrate a magnetic flux $\phi 1$ passing through the opening OP1 of the loop conductor 10 and a magnetic flux $\phi 2$ passing through the coil element 20. As illustrated in FIG. 13, the relationship in which the magnetic flux $\phi 1$ passing through the opening OP1 of the loop conductor 10 and the magnetic flux $\phi 2$ passing through the coil element 20 do not cancel each other out is the cumulative connection. As illustrated in FIG. 14, the relationship in which the magnetic flux $\phi 1$ passing through the opening OP1 of the loop conductor 10 and the magnetic flux $\phi 2$ passing through the coil element 20 cancel each other is the differential connection.

Figure 15A:
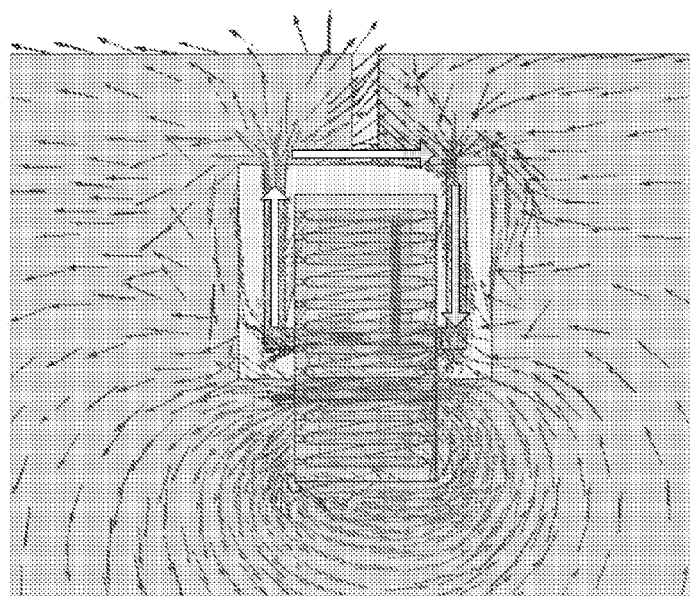
FIG. 15A illustrates a distribution of the intensity of a current flowing in each conductor during the cumulative connection.
Figure 15B:
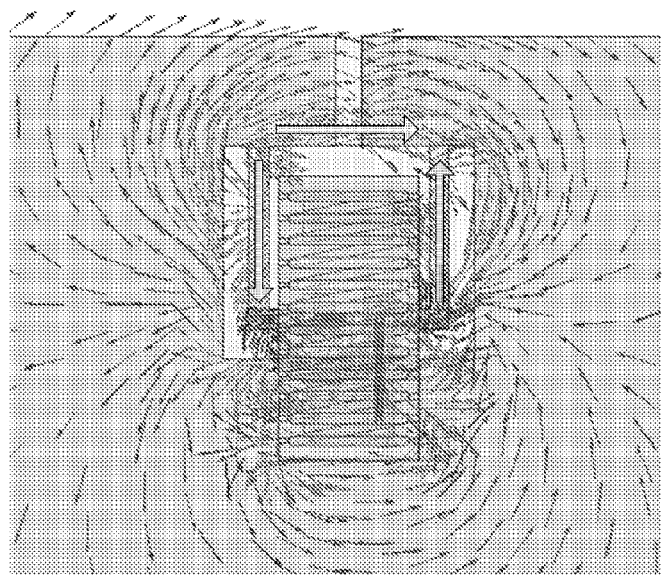
FIG. 15B illustrates a distribution of the intensity of a current flowing in each conductor during the differential connection.

FIG. 15A illustrates a distribution of the intensity of a current flowing in each conductor during the cumulative connection, and FIG. 15B illustrates a distribution of the intensity of a current flowing in each conductor during the differential connection. In FIGS. 15A and 15B, the thick arrows indicate directions of the current flowing in the loop conductor.

For the cumulative connection, as illustrated in FIG. 15A, the directions of the current flowing in the loop conductor are distributed such that it circulates in the same direction. For the differential connection, as illustrated in FIG. 15B, the directions of the current flowing in the loop conductor are distributed such that it circulates at least partially in opposite directions. Accordingly, when the loop conductor 10 and secondary coil in the coil element are in cumulative connection, the magnetic flux produced by the loop conductor and the magnetic flux produced by the coil element strengthen each other, and the coupling coefficient between the secondary coil and loop conductor, the coupling coefficient between the loop conductor and communication-partner antenna, and the coupling coefficient between the coil conductor (primary coil) and communication-partner antenna are increased, as compared to those in the differential connection relationship.

Third Preferred Embodiment

In a third preferred embodiment of the present invention, changes in the coupling coefficient between the coils corresponding to differences in the positional relationship between the secondary coil and loop conductor are illustrated.

Figure 16A:
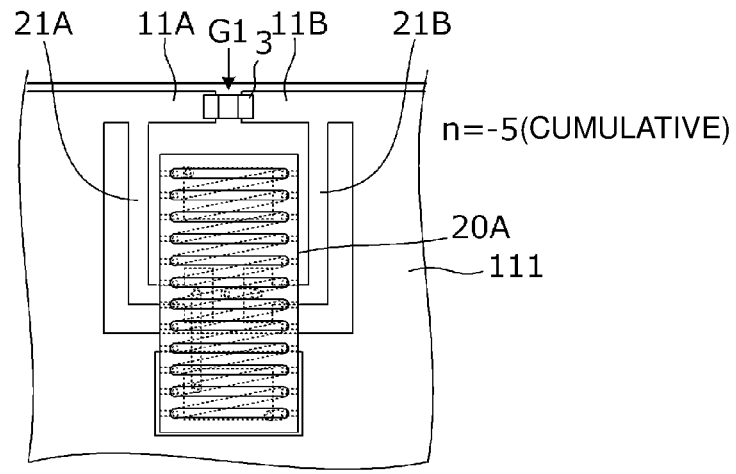
FIG. 16A is a plan view of the coil element placement portion in the antenna device including the coil element 20A.
Figure 16B:
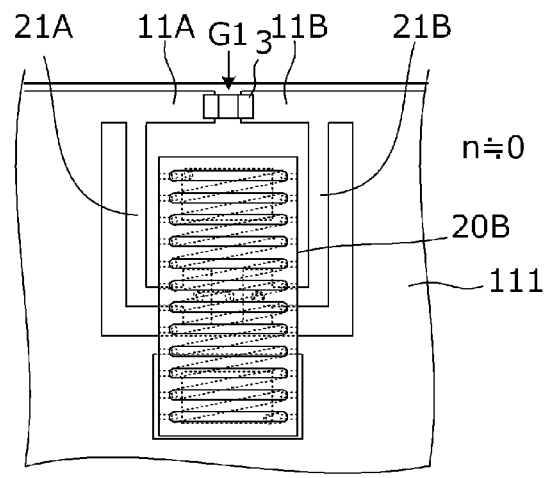
FIG. 16B is a plan view of the coil element placement portion in the antenna device including the coil element 20B.
Figure 16C:
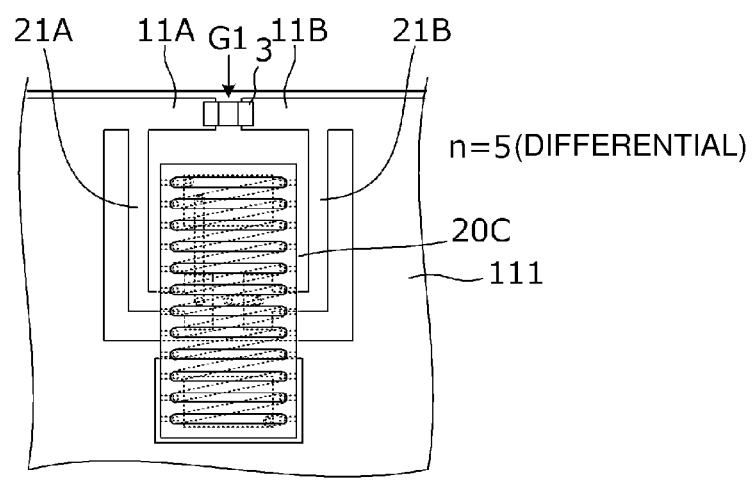
FIG. 16C is a plan view of the coil element placement portion in the antenna device including the coil element 20C.

FIG. 16A is a plan view of the coil element placement portion in the antenna device including the coil element 20A, FIG. 16B is a plan view of the coil element placement portion in the antenna device including the coil element 20B, and FIG. 16C is a plan view of the coil element placement portion in the antenna device including the coil element 20C. The secondary coil in the antenna device illustrated in FIG. 16A overlaps the planar conductor 111 as seen in plan view. The secondary coil in the antenna device illustrated in FIG. 16C does not overlap the planar conductor 111 as seen in plan view. The antenna device illustrated in FIG. 16A is the one in which the number of turns n of the secondary coil=−5 and is in cumulative connection. The antenna device illustrated in FIG. 16B is the one in which the number of turns n of the secondary coil≈0. The antenna device illustrated in FIG. 16C is the one in which the number of turns n of the secondary coil=5 and is in differential connection.

Figure 17A:
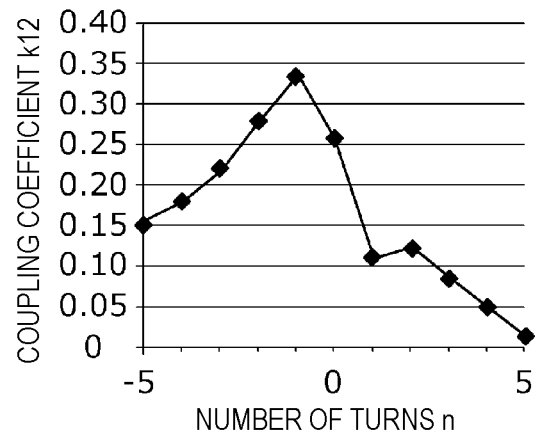
FIG. 17A illustrates changes in the coupling coefficient k12 between the coupling coil in the coil element and loop conductor 10 with respect to the number of turns n of the secondary coil.
Figure 17B:
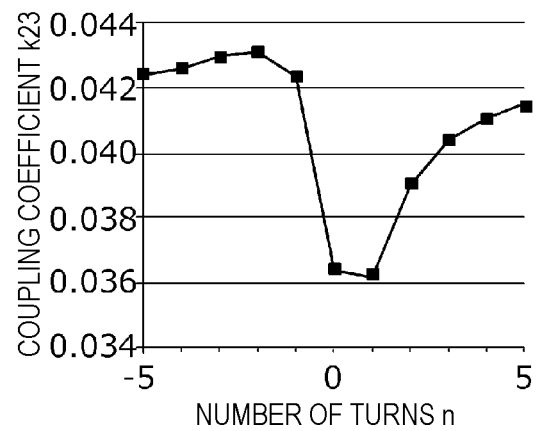
FIG. 17B illustrates changes in the coupling coefficient k23 between the loop conductor 10 and communication-partner antenna 500 with respect to the number of turns n of the secondary coil.
Figure 17C:
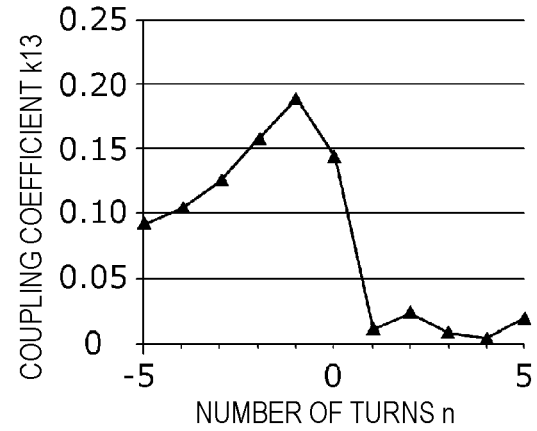
FIG. 17C illustrates changes in the coupling coefficient k13 between the coupling coil in the coil element and communication-partner antenna 500 with respect to the number of turns n of the secondary coil.

FIG. 17A illustrates changes in the coupling coefficient k12 between the coupling coil in the coil element and loop conductor 10 (see FIG. 7) with respect to the number of turns n of the secondary coil. FIG. 17B illustrates changes in the coupling coefficient k23 between the loop conductor 10 and communication-partner antenna 500 with respect to the number of turns n of the secondary coil. FIG. 17C illustrates changes in the coupling coefficient k13 between the coupling coil in the coil element and communication-partner antenna 500 with respect to the number of turns n of the secondary coil.

Comparison between FIGS. 17A to 17C and FIGS. 12A to 12C reveals that, when the number of turns n=−5 in the third preferred embodiment, because of cumulative connection, the coupling coefficients k13 and k23 are improved, as compared to those when the number of turns n=−5 in the second preferred embodiment, but because the secondary coil overlaps the planar conductor 111, the coupling coefficients k12 and k13 are degraded, as compared to those when the number of turns n=5 in the second preferred embodiment.

Figure 18A:
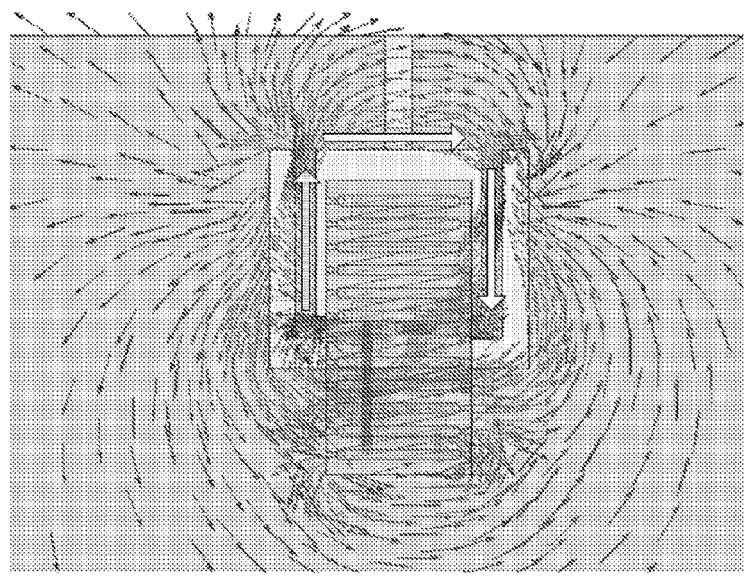
FIG. 18A illustrates a distribution of the intensity of a current flowing in each conductor in a state in which the secondary coil overlaps a planar conductor 111.
Figure 18B:
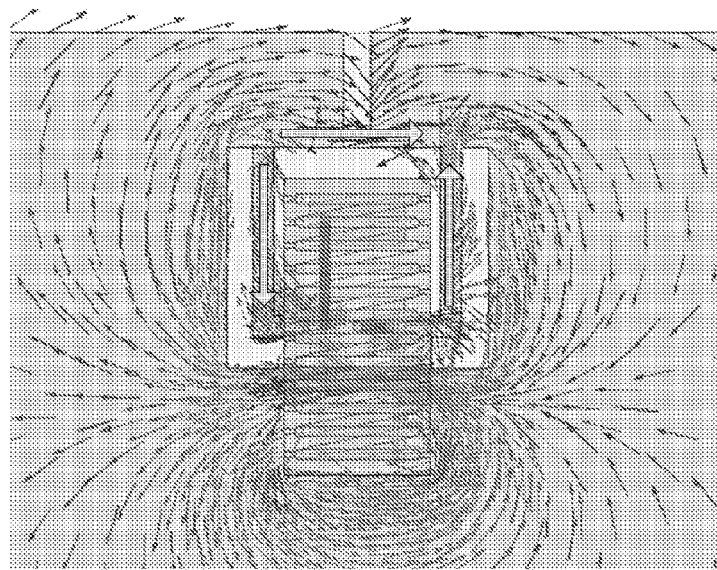
FIG. 18B illustrates a distribution of the intensity of a current flowing in each conductor in a state in which the secondary coil does not overlap the planar conductor 111.

FIG. 18A illustrates a distribution of the intensity of a current flowing in each conductor in a state in which the secondary coil overlaps the planar conductor 111, and FIG. 18B illustrates a distribution of the intensity of a current flowing in each conductor in a state in which the secondary coil does not overlap the planar conductor 111. In FIGS. 18A and 18B, the thick arrows indicate directions of the current flowing in the loop conductor.

For the cumulative connection, as illustrated in FIG. 18A, the directions of the current flowing in the loop conductor are distributed such that it circulates in the same direction. For the differential connection, as illustrated in FIG. 18B, the directions of the current flowing the loop conductor are distributed such that it circulates at least partially in opposite directions. In the third preferred embodiment, however, it is determined that even in the cumulative connection, because the secondary coil overlaps the planar conductor as seen in plan view, both of the coupling coefficients k12 and k13 are degraded, as compared to those in the cumulative connection in the second preferred embodiment.

Fourth Preferred Embodiment

In a fourth preferred embodiment of the present invention, an example of an antenna device that uses a conductive portion of a housing of an electronic apparatus as a loop conductor and the electronic apparatus including the same are illustrated.

Figure 19:
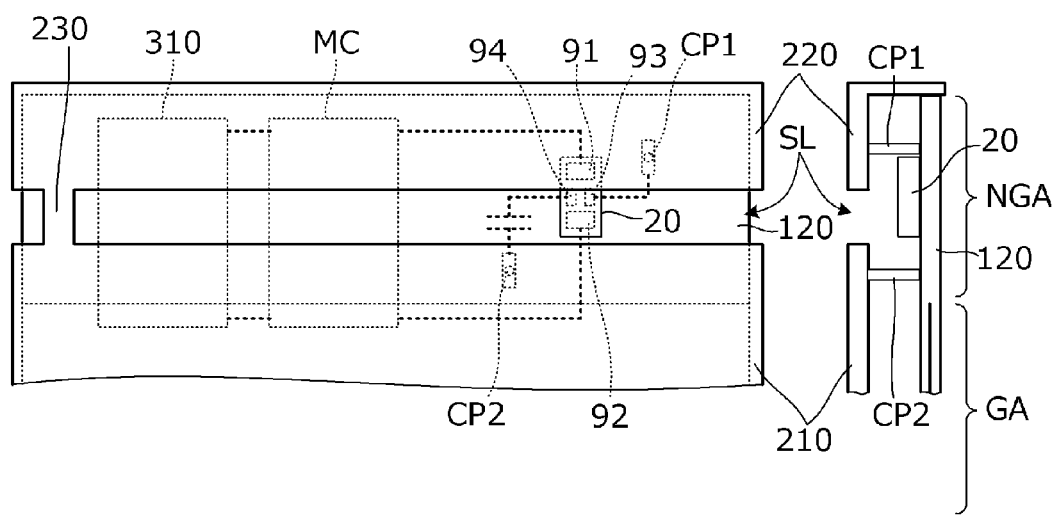
FIG. 19 illustrates a plan view and a right side view of a main portion of an electronic apparatus according to a fourth preferred embodiment of the present invention.

FIG. 19 illustrates a plan view and a right side view of a main portion of the electronic apparatus according to the fourth preferred embodiment. FIG. 19 illustrates a state without a housing resin portion.

One example of the electronic apparatus may be a portable electronic apparatus, such as a smartphone, and includes a first conductive portion 210 and a second conductive portion 220 of a housing on a side opposite to a surface at which a display and an operation panel are provided. The first conductive portion 210 and the second conductive portion 220 are connected to each other with a conductive portion 230 interposed therebetween. A housing resin portion 240 is disposed in (fills) a slit SL provided between the first conductive portion 210 and the second conductive portion 220.

A wiring substrate 120 is disposed on an inner side of the first conductive portion 210 and the second conductive portion 220. The wiring substrate 120 includes a ground area GA at which a ground conductor extending in a planar shape is provided and a non-ground area NGA at which the ground conductor extending in a planar shape is not provided. In the non-ground area NGA of the wiring substrate 120, the coil element 20 and a capacitor C3 (not illustrated) are mounted. Furthermore, the RFIC 310 and the matching circuit MC are mounted on the wiring substrate 120. The patterns on the wiring substrate 120 are connected to the first conductive portion 210 and the second conductive portion 220, respectively, with contact pins CP1 and CP2 interposed therebetween.

The coil element 20 is the same or substantially the same as the coil element 20 illustrated in the first preferred embodiment. The first terminal 91 and the second terminal 92 of the coil element 20 are connected to the matching circuit MC, and the third terminal 93 and fourth terminal 94 are connected to the first conductive portion 210 and the second conductive portion 220 with the capacitor C3 interposed therebetween. Accordingly, the path from the third terminal 93 of the coil element 20 to the contact pin CP1 to the second conductive portion 220 to the conductive portion 230 to the first conductive portion 210 to the contact pin CP2 defines and functions as the loop conductor.

In this manner, the first conductive portion 210 and the second conductive portion 220 of the housing may define a portion of the loop conductor. As in this example, the portion of the loop conductor may preferably be a planar conductor, for example. Moreover, a planar conductor on the wiring substrate may define a portion of the loop conductor.

In some preferred embodiments descried above, the conductive portion of the housing of the electronic apparatus is used as the first conductive portion and the second conductive portion. A metal portion inside the electronic apparatus, such as a chassis or battery, may be used to define a portion of the loop conductor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a base; and
   a coil element of an antenna coil, the coil element including a coil conductor, a first terminal connected to a first end of the coil conductor, a second terminal connected to a second end of the coil conductor, and a third terminal and a fourth terminal extended from a secondary coil conductive portion of the coil conductor; wherein
   the first terminal and the second terminal are connected to a power feed circuit;
   the base includes a radiating conductor connected to the third terminal and the fourth terminal; and
   the coil element and the radiating conductor are magnetically coupled to a communication-partner antenna.

2. The antenna device according to claim 1, wherein the coil element includes an insulating body, the coil conductor is disposed inside the insulating body, and the first terminal, the second terminal, the third terminal, and the fourth terminal are disposed on an outer surface of the insulating body.

3. The antenna device according to claim 1, wherein the radiating conductor is a loop conductor defining a loop opening.

4. The antenna device according to claim 3, further comprising a capacitor connected in series to the loop conductor.

5. The antenna device according to claim 4, wherein
the base further includes a planar conductor; and
the planar conductor is electrically connected to the loop conductor, and surrounds the loop conductor.

6. The antenna device according to claim 5, wherein the secondary coil conductive portion does not overlap the planar conductor when the base is seen in plan view.

7. The antenna device according to claim 3, wherein the loop conductor and the secondary coil conductive portion are cumulatively connected to each other.

8. The antenna device according to claim 3, wherein the secondary coil conductive portion overlaps the loop opening when the base is seen in plan view.

9. The antenna device according to claim 3, wherein the loop conductor includes a planar portion extending in a planar shape.

10. The antenna device according to claim 9, further comprising:
a housing that houses the base; wherein
at least a portion of the secondary coil conductive portion is a conductive portion of the housing.

11. An electronic apparatus comprising:
an antenna device; wherein
the antenna device includes:
a base;
a coil element of an antenna coil, the coil element including a coil conductor, a first terminal connected to a first end of the coil conductor, a second terminal connected to a second end of the coil conductor, and a third terminal and a fourth terminal extended from a secondary coil conductive portion of the coil conductor; and
a first electrode, a second electrode, a third electrode, a fourth electrode, and a radiating conductor that are disposed on the base, the first electrode is connected to the first terminal and links to a power feed circuit, the second electrode is connected to the second terminal and links to the power feed circuit, the third electrode is connected to the third terminal, the fourth electrode is connected to the fourth terminal, the radiating conductor links to the third electrode and the fourth electrode and defines a loop current path together with the third electrode and the fourth electrode; and
the coil element and the radiating conductor are magnetically coupled to a communication-partner antenna.

12. The electronic apparatus according to claim 11, wherein the coil element includes an insulating body, the coil conductor is disposed inside the insulating body, and the first terminal, the second terminal, the third terminal, and the fourth terminal are disposed on an outer surface of the insulating body.

13. The electronic apparatus according to claim 11, wherein the radiating conductor is a loop conductor defining a loop opening.

14. The electronic apparatus according to claim 13, further comprising a capacitor connected in series to the loop conductor.

15. The electronic apparatus according to claim 14, wherein
the base further includes a planar conductor; and
the planar conductor is electrically connected to the loop conductor, and surrounds the loop conductor.

16. The electronic apparatus according to claim 15, wherein the secondary coil conductive portion does not overlap the planar conductor when the base is seen in plan view.

17. The electronic apparatus according to claim 13, wherein the loop conductor and the secondary coil conductive portion are cumulatively connected to each other.

18. The electronic apparatus according to claim 13, wherein the secondary coil conductive portion overlaps the loop opening when the base is seen in plan view.

19. The electronic apparatus according to claim 13, wherein the loop conductor includes a planar portion extending in a planar shape.

20. The electronic apparatus e according to claim 19, further comprising:
a housing that houses the base; wherein
at least a portion of the secondary coil conductive portion is a conductive portion of the housing.

* * * * *